United States Patent [19]

Tahara et al.

[11] Patent Number: 5,523,380

[45] Date of Patent: Jun. 4, 1996

[54] POLYMERS HAVING HYDROXYL AND CARBOXYL GROUPS, AND PRODUCTION PROCESS THEREOF

[75] Inventors: Hideyuki Tahara, Osaka; Hiroshi Itoh, Kobe; Keiji Kofuji, Yamatokoriyama; Masahito Takagi, Takatsuki, all of Japan

[73] Assignee: Nippon Shokubai Co., Ltd., Osaka, Japan

[21] Appl. No.: 273,149

[22] Filed: Jul. 13, 1994

[51] Int. Cl.$^6$ .................................. C08G 63/00
[52] U.S. Cl. .................. 528/271; 528/292; 528/306; 528/499
[58] Field of Search .................. 528/230, 330.1, 528/344, 386, 499, 271, 292, 306

[56] References Cited

U.S. PATENT DOCUMENTS 3,510,462  5/1970  Hayes et al. .................. 525/330.1

FOREIGN PATENT DOCUMENTS 05214015  8/1993  Japan.
05214016  8/1993  Japan.

OTHER PUBLICATIONS

"Epoxidation of Styrene–Butadiene Block Polymers", K. Udipi, Journal of Applied Polymer Science, vol. 23, 3301–3309 (1979).

*Primary Examiner*—Nathan M. Nutter
*Assistant Examiner*—Richard Jones
*Attorney, Agent, or Firm*—Roylance, Abrams, Berdo & Goodman

[57] ABSTRACT

A polymer comprising an α-glycol structure unit

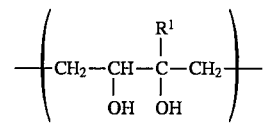

and a carboxylic acid-based structure unit

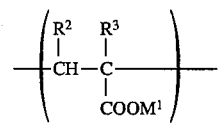

provides superior results with respect to dispersibility, a chelating ability and a viscosity-stabilizing effect and is useful as a detergent builder, pigment- and cement-dispersing agents, a hydrogen peroxide stabilizer and a gas barrier agent. This polymer can further comprise the following lactone structure unit.

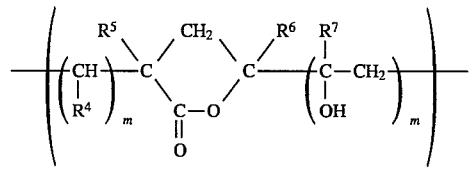

This polymer can be produced by copolymerizing a conjugated diene monomer and a carboxylic acid-based monomer and oxidizing a copolymer obtained.

20 Claims, No Drawings

POLYMERS HAVING HYDROXYL AND CARBOXYL GROUPS, AND PRODUCTION PROCESS THEREOF

BACKGROUND OF THE INVENTION

1. Technical Field

The present invention relates to a polymer having hydroxyl and carboxyl groups and also to its production process and use.

2. Background Art

As the polymer having hydroxyl and carboxyl groups, known are, for example, a modified polyvinyl alcohol and a polyhydroxyacrylic acid.

The modified polyvinyl alcohol is produced by copolymerizing vinyl acetate and an acrylic acid ester and then saponifying the resulting copolymer.

The polyhydroxyacrylic acid is produced by polymerizing $\alpha$-hydroxyacrylic acid and then removing the by-product salts.

A partially lactonized product from the modified polyvinyl alcohol and the polyhydroxyacrylic acid is also known. This partially lactonized product is obtained by reacting part of the hydroxyl groups of said alcohol with part of the carboxyl groups of said acid to form lactone rings.

However, the modified polyvinyl alcohol is inferior in dispersibility or lacks a chelating ability or a viscosity-stabilizing ability. In addition, the partially lactonized product from the modified polyvinyl alcohol and the polyhydroxyacrylic acid also is inferior in dispersibility or lacks a chelating ability or a viscosity-stabilizing ability.

There is also a process for producing the modified polyvinyl alcohol which comprises a saponification step of carrying out a reaction which involves elimination of an ester. However, this saponification step is industrially disadvantageous, because it involves complex procedures and because production costs are expensive.

The modified polyvinyl alcohol, the polyhydroxyacrylic acid and their partially lactonized product were proposed for uses as a detergent builder, a pigment-dispersing agent, a cement-dispersing agent, a stabilizer for hydrogen peroxide, and so on.

However, as to the polyhydroxyacrylic acid, $\alpha$-hydroxyacrylic acid of a starting material is expensive and in addition the production process is industrially disadvantageous because it involves complex procedures. Therefore, the polyhydroxyacrylic acid is not practically used for the detergent builder and the pigment-dispersing agent.

When used as detergent builders, the modified polyvinyl alcohol and the partially lactonized product provide inferior results when compared with conventional sodium polyacrylate with regard to an improving effect upon washing-power.

When used as pigment-dispersing agents, the modified polyvinyl alcohol and the partially lactonized product provide inferior results when compared with conventional sodium polyacrylate with regard to dispersibility and a viscosity-stabilizing ability. Because of this, the viscosity of a pigment dispersion is high and increases with time. Therefore handling is hard.

When used as cement-dispersing agents, the modified polyvinyl alcohol, the polyhydroxyacrylic acid and their partially lactonized product provide inferior results when compared with a conventional sodium naphthalene-sulfonate-formalin condensation product or sodium lignin-sulfonate with regard to an ability to prevent slump loss.

When the modified polyvinyl alcohol and the partially lactonized product are used as stabilizers for hydrogen peroxide, hydrogen peroxide easily decomposes in comparison with the case of using conventional sodium polyacrylate.

The modified polyvinyl alcohol, the polyhydroxyacrylic acid and their partially lactonized product have an film-forming ability. However, they have no especially useful character other than that the film formed from them easily dissolves in water.

SUMMARY OF THE INVENTION

Objects of the Invention

It is an object of the present invention to provide a polymer having hydroxyl and carboxyl groups having superior characters such as dispersibility, a chelating ability and a viscosity-stabilizing ability.

It is another object of the invention to provide an industrially superior process which can produce said polymer having hydroxyl and carboxyl groups without carrying out the aforementioned reaction involving elimination of an ester.

It is another object of the invention to provide a detergent builder having a superior improving effect upon washing-power of a detergent.

It is another object of the invention to provide a detergent composition of which the washing-power is improved.

It is another object of the invention to provide a pigment-dispersing agent having superior pigment-dispersibility and to lower the viscosity of a pigment dispersion.

It is another object of the invention to provide a pigment dispersion having a low viscosity in which a pigment is dispersed in very stable condition.

It is another object of the invention to provide a cement-dispersing agent giving high fluidity to a cement composition and displaying a superior ability to prevent slump loss without much retarding the time for setting the cement composition.

It is another object of the invention to provide a cement composition which involves little retardation of the time for setting the cement composition, has high fluidity and also has a superior ability to prevent slump loss.

It is another object of the invention to provide a stabilizer for hydrogen peroxide, which makes it possible to use, in stable condition, hydrogen peroxide as a bleacher having a bleaching effect superior to sodium silicate.

It is another object of the invention to provide a bleaching composition which has a superior bleaching effect, suppresses strength-deterioration of bleached fibers, has a superior ability to block metal ions, and also gives good feeling to bleached articles, as compared with sodium silicate.

It is another object of the invention to provide a gas barrier agent which is useful as a means for cutting off permeation of gases.

It is another object of the invention to provide a coated molded product which is coated with a coating layer having transparency, flexibility and an ability as a gas barrier.

Disclosure of the Invention

The polymer having hydroxyl and carboxyl groups of the present invention comprises an $\alpha$-glycol structure unit and a carboxylic acid-based structure unit.

This polymer may further comprise a lactone structure unit.

The above-mentioned α-glycol structure unit is shown by the following general formula 1

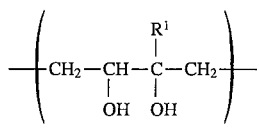

wherein $R^1$ denotes a hydrogen atom, a methyl group or a chlorine atom.

The above-mentioned carboxylic acid-based structure unit is shown by the following general formula 2

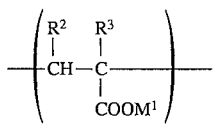

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group.

The above-mentioned lactone structure unit is shown by the following general formula 3

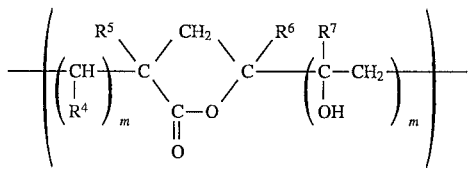

wherein $R^4$ denotes —$COOM^3$, a hydrogen atom or a methyl group, where in $R^5$ denotes a hydrogen atom or a methyl group, wherein $R^6$ and $R^7$ denote a hydrogen atom, a methyl group or a chlorine atom, with the proviso that at least one of $R^6$ and $R^7$ is a hydrogen atom, wherein $M^3$ denotes a hydrogen atom, a monovalent metal, a divalent metal, a trivalent metal, an ammonium group or an organic amine group, and wherein m is 0 or 1.

The process of the present invention for producing a polymer having hydroxyl and carboxyl groups comprises: (1) a copolymerizing step and (2) an oxidizing step.

In the above-mentioned copolymerizing step (1), a monomer composition comprising a conjugated diene monomer and a carboxylic acid-based monomer is copolymerized to obtain a copolymer including a double bond-containing structure unit and the above-mentioned carboxylic acid-based structure unit.

The above-mentioned conjugated diene monomer is shown by the following general formula 4

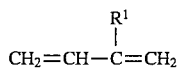

wherein $R^1$ denotes a hydrogen atom, a methyl group or a chlorine atom.

The above-mentioned carboxylic acid-based monomer is shown by the following general formula 5

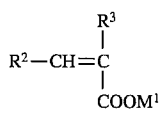

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group.

The above-mentioned double bond-containing structure unit is shown by the following general formula 6

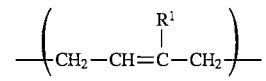

wherein $R^1$ denotes a hydrogen atom, a methyl group or a chlorine atom.

In the above-mentioned oxidizing step (2), a double bond part of the double bond-containing structure unit of the copolymer obtained by the above step (1) is oxidized using an oxidizing agent to convert the double bond-containing structure unit into the above-mentioned α-glycol structure unit.

The production process of the present invention may further comprise (3) a ring-closing step simultaneously with or after the above-mentioned oxidizing step (2).

In the ring-closing step (3), a lactone ring is formed between the α-glycol structure unit and carboxylic acid-based structure unit of the copolymer obtained by the step (1).

The polymer having hydroxyl and carboxyl groups of the present invention can be used as a detergent builder, a pigment-dispersing agent, a cement-dispersing agent, a stabilizer for hydrogen peroxide, and a gas barrier agent.

DETAILED DISCLOSURE OF THE INVENTION

The polymer of the present invention comprises, based on the total of all structure units, for example, 20 to 75 mol % (preferably 22.5 to 75 mol %) of the α-glycol structure unit, 20 to 75 mol % (preferably 22.5 to 75 mol %) of the carboxylic acid-based structure unit and 0 to 20 mol % (preferably 0 to 10 mol %) of another structure unit.

If the content of the α-glycol structure unit in the polymer is less than the above-mentioned range, there may not be expected the improvement of performance such as a chelating ability and dispersibility because of containing hydroxyl groups. If the content of the carboxylic acid-based structure unit in the polymer is less than the above-mentioned range, there may be lowered the performance such as a chelating ability and dispersibility of a carboxylic acid. It is not until the contents of both the structure units are within the above-mentioned range that the above-mentioned superior performance is displayed which is not obtained by conventional carboxylic acid-based polymers.

If the content of another structure unit in the polymer is more than the above-mentioned range, there may be lowered the performance of the polymer. Therefore, it is more preferable that the content of another structure unit is as low as possible.

In the polymer of the present invention, all structure units are linked to form a straight chain, and the arrangement of the structure units may be either regular or irregular.

The polymer of the present invention has a weight-average molecular weight of, for example, 1,000 to 1,000,000, preferably 1,000 to 500,000, and more preferably 1,000 to 200,000.

If the weight-average molecular weight of the polymer is less than the above-mentioned range, there may not be displayed the chelating ability or dispersibility. In addition, if this weight-average molecular weight is more than the above-mentioned range, not only the production may be difficult, but also the dispersibility may be lowered.

The α-glycol structure unit is derived from the conjugated diene monomer. The carboxylic acid-based structure unit is derived from the carboxylic acid-based monomer. The lactone structure unit is derived from the conjugated diene monomer and the carboxylic acid-based monomer. The other structure unit is derived from a conjugated diene monomer or another copolymerizable monomer.

The amount of the monomers used is as follows: based on the total of all the monomers, for example, 20 to 75 mol % (preferably 40 to 60 mol %) of the conjugated diene monomer, 20 to 75 mol % (preferably 40 to 60 mol %) of the carboxylic acid-based monomer and 0 to 20 mol % (preferably 0 mol %) of the other monomer.

If the amount of the conjugated diene monomer is less than the above-mentioned range, the amount of the α-glycol structure unit may be lowered which is obtained by way of the oxidizing step.

If the amount of the carboxylic acid-based monomer is less than the above-mentioned range, there may be lowered the performance such as a chelating ability and dispersibility of a carboxylic acid.

If the amount of the other monomer is more than the above-mentioned range, there may be lowered the performance of the polymer.

To obtain the polymer of the present invention, there are carried out the following steps: copolymerizing the conjugated diene monomer with the carboxylic acid-based monomer by a conventional method; and then oxidizing the resulting copolymer using an oxidizing agent.

Examples of the conjugated diene monomer are butadiene, isoprene, chloroprene and the like. In addition, examples of the carboxylic acid-based monomer are monocarboxylic acids such as acrylic acid, methacrylic acid and crotonic acid; dicarboxylic acids such as maleic acid and fumaric acid; and salts of these carboxylic acids. Each of the conjugated diene monomer and carboxylic acid-based monomer may be used either alone or in combinations of two or more with each other.

Examples of another copolymerizable monomer are monoesters or diesters of unsaturated carboxylic acids such as (meth)acrylic acid, maleic acid and fumaric acid with aliphatic alcohols having 1 to 20 carbon atoms, with glycols having 2 to 4 carbon atoms, with polyalkyleneglycols of 2 to 100 in addition mole number of said glycols, or with alkoxy(poly)alkyleneglycols derived from aliphatic alcohols having 1 to 5 carbon atoms and said glycols or polyalkyleneglycols; alkenyl acetates such as vinyl acetate and propenyl acetate; aromatic vinyl monomers such as styrene, p-methylstyrene, styrenesulfonic acid; unsaturated sulfonic acids such as 2-acrylamido-2-methylpropanesulfonic acid, 2-sulfoethyl (meth)acrylate, vinylsulfonic acid and allylsulfonic acid and salts thereof (meth)acrylamides such as (meth)acrylamide, N-methylacrylamide, N,N-dimethylacrylamide, N-(meth)acryloylpiperidine and N-(meth) acryloylmorpholine; vinyl chloride; and so on. These compounds may be used either alone or in combinations of two or more with each other.

In the production process of the present invention, a double-bond part of the double bond-containing structure unit is, as aforementioned, oxidized to form the α-glycol structure unit. However, on this occasion, some of the double-bond parts may remain unoxidized. In addition, in the case where the pH of a system is low after the above-mentioned oxidation, a hydroxyl group in the α-glycol structure unit may react with a carboxyl group in the carboxylic acid-based structure unit adjacent to the above-mentioned α-glycol structure unit to form a 5-membered ring lactone part. When the total amount of the α-glycol structure unit and carboxylic acid-based structure unit in the new polymer is calculated, the above-mentioned lactone part and unoxidized double-bond part are calculated as parts other than the α-glycol structure unit and carboxylic acid-based structure unit. In addition, in the case where the new polymer further comprises a part derived from the above-mentioned another monomer, this part is also calculated as the part other than the α-glycol structure unit and carboxylic acid-based structure unit.

In the production process of the present invention, the aforementioned monomer composition (raw material components) for producing the new polymer may be copolymerized using a polymerization initiator. On this occasion, the kind of the polymerization is not limited, for example, the polymerization may be carried out by ion polymerization, radical polymerization and so on. However, it is preferable to carry out the copolymerization in the presence of a radical polymerization initiator. In addition, the copolymerization may also be carried out by other conventional polymerization methods such as bulk polymerization, solution polymerization, suspension polymerization and emulsion polymerization.

The polymerization in a solvent may be carried out either in a batch manner or continuous manner. As examples of the solvent used on this occasion, there are cited hydrocarbons such as benzene, toluene, xylene and cyclohexane; halogenated hydrocarbons such as chloroform and carbon tetrachloride; ketones such as acetone, cyclohexanone and methyl ethyl ketone; esters such as ethyl acetate and isopropyl acetate; ethers such as dibutyl ether, tetrahydrofuran and dioxane; lower alcohols such as methyl alcohol, ethyl alcohol and isopropyl alcohol; dimethyl sulfoxide; dimethylformaldehyde; gamma-butyrolactone; and water.

Typical examples of the radical polymerization initiator used in carrying out radical polymerization are as follows: peroxides such as bonzoyl peroxide and dilauroyl peroxide; azo comounds such as azo bisisobutyronitrile, 2,2'-azobis(2, 4-dimethylvaleronitrile and 1,1'-azobiscyclohexane-1-carbonitrile; hydroperoxides such as cummen hydroperoxide and tert-butyl hydroperoxide; persulfates such as potassium persulfate and ammonium persulfate.

Molecular weight control over the polymer is achieved by controlling the amount of the initiator used or by carrying out solution polymerization using a solvent or a chain transfer agent-added system. The larger the amount of the initiator is, the lower the molecular weight is. A copolymer obtained in this way is oxidized using an oxidizing agent under conditions where to this copolymer nothing is added or, in case of necessity, water is added. As a result, the double-bond part of the double bond-containing structure unit of the copolymer is oxidized to form the α-glycol structure unit, whereby the polymer of the present invention is obtained. In this case, as occasion demands, the above-mentioned copolymer may be neutralized by a basic substance to convert the carboxyl group into salt in at least one stage selected from: at the same time as, before and after the above-mentioned oxidizing step.

As to the mechanism of the conversion of the double bond into the α-glycol structure, there are two mechanisms as follows: 1) the double bond is directly converted into the α-glycol structure by an oxidizing agent; 2) an epoxide once formed from the double bond and then this epoxide is hydrolyzed to form the α-glycol structure.

The oxidation may be carried out by conventional oxidizing agents and methods. Of the oxidizing agents, particularly preferred are permanganates and organic peroxides. In addition, in the case of using the permanganates as oxidizing agents, the pH of a system is preferably maintained at 7 to 13, more preferably at 12 to 13, in order to prevent a ketol or diketone from being formed simultaneously with the conversion of the double bond into the α-glycol structure and also to prevent the double bond from being cleaved simultaneously with said conversion.

In the case of using the organic peroxide, it may be added directly, or otherwise hydrogen peroxide and an organic acid may together be added to a system to make this combination act as an organic peroxide. Like this, the oxidizing agents may be used either alone or in combinations of two or more with each other. In the case of using as the oxidizing agent the combination of hydrogen peroxide and an organic acid, examples of the organic acid used are as follows: formic acid, acetic acid, benzoic acid, phthalic acid, polyacrylic acid and the like. Together with these organic acids, there may be used an acid catalyst, if necessary. As examples of this acid catalyst, there can be cited strong, mineral or organic acids as usually used in the epoxidation technology. Preferable examples of the strong mineral acid are sulfuric acid and phosphoric acid. Preferable examples of the strong organic acid are trihaloacetic acids such as trichloroacetic acid; organic sulfonic acids such as methanesulfonic acid and toluenesulfonic acid; and sulfuric acid positive ion exchange resins.

The oxidative reaction may be carried out at a temperature of 0° to 100° C. Taking the reaction rate, the prevention of unpreferable side reactions, and so on into consideration, the preferable reaction temperature is in a range of 20° to 90° C. As to the new polymer obtained in this way, if the pH of a system is high after oxidation, this polymer may be used for various purposes even intactly. However, as aforementioned, if the pH of a system is low after oxidation, part of the hydroxyl groups and part of the carboxyl groups in the polymer may form a 5-membered ring lactone structure. Thus, in the case where the pH of a system is low after oxidation, the system may, if necessary, be neutralized by an alkaline substance to open the lactone ring or to prevent formation of the lactone ring. Preferable examples of the above-mentioned alkaline substance are hydroxides, chlorides or carbonates of mono-, di- or trivalent metals; ammonia; organic amines; and the like. The opening of the lactone ring may be carried out at normal temperature; however, as occasion demands, it may be carried out with heating.

A lactone ring easily forms in a polymer, in the case where a carboxyl group and a hydroxyl group are adjacent to each other in the polymer and particularly in the case where a 5-membered ring lactone may form. Because of this, the 5-membered ring lactone may be formed in the new polymer obtained by the above-mentioned process. Therefore, this polymer can be used in various uses even in condition where the 5-membered ring lactone is formed. However, in this case, a system used needs to be in alkaline condition, because the carboxyl and hydroxyl groups formed by the opening of the lactone ring display effects in various uses. In the case where the formation of the lactone ring is necessary, the lactone ring can be formed by adding an acidic substance to a system to lower its pH. The acidic substance used in this case is not especially limited. However, its examples are hydrochloric acid, sulfuric acid, nitric acid and the like.

As means for identifying structure of a new polymer obtained, there are cited, for example, determination of acid value and hydroxyl group value; analyses by infra-red absorption spectroscopy, nuclear magnetic resonance spectroscopy, gel permeation chromatography (GPC); and the like.

Hereinafter, uses of the new polymer relating to the present invention are explained.

This polymer is useful as a detergent builder. The detergent builder comprising this polymer provides superior results with respect to an improving effect upon washing-power because of a chelating effect of the carboxyl and hydroxyl groups of this polymer. This detergent builder is greatly superior to zeorite in buildability. Thus, when this builder is combined with a surfactant to make a detergent composition, the amount of the surfactant combined can be reduced. Since the detergent builder of the present invention is superior in solubility as well, it can be applied not only to detergents for clothes, but also widely to other general detergent fields such as detergents for housing.

The new polymer of the present invention makes it possible to prepare a high concentrated aqueous pigment dispersion and also to give this dispersion a superior viscosity stability, because of superior dispersing ability of carboxyl and hydroxyl groups of this polymer. Thus, this new polymer is useful as a pigment-dispersing agent as well. This dispersing agent makes it possible to prepare a dispersion which has a low viscosity and superior stability even at high concentration. Because of this, the new polymer can especially preferably be used as a dispersing agent employed for dispersing pigments for coated paper and in addition, the new polymer can also be applied in wide fields such as fiber-processing, buiding materials-processing, coatings and ceramics. As examples of pigments for coatings using the dispersing agent of the present invention, there are cited kaolin, clay, calcium carbonate, titanium oxide, barium sulfate, magnesium hydroxide and the like. A liquid coating is prepared by adding to the above-mentioned aqueous pigment dispersion the following pigment binders: casein, starch, a styrene/butadiene latex, and the like. These binders may be used either as one kind alone or as any mixture thereof.

The new polymer of the present invention is useful as a cement-dispersing agent. This polymer gives high fluidity and slump-loss preventability to cement compositions such as cement mortar and concrete without retarding the time for setting the cement composition. Therefore, this polymer greatly improves working easiness during construction using mortar or concrete. Accordingly, the cement-dispersing agent comprising this polymer can effectively be used, for example, as a superplasticizer for concrete such as ready mixed concrete. Particularly, this cement-dispersing agent easily makes it to possible to produce ready mixed concrete having formulation of a high water-reduced ratio as a high performance air-entraining water-reducing agent of a type added simultaneously in plants. In addition, this cement-dispersing agent can effectively be used as a high performance water-reducing admixture for producing secondary products of concrete. This cement-dispersing agent can further be used to disperse hydraulic cement such as portland cement, alumina cement and various mixed cement or to disperse hydraulic materials other than cement such as plaster.

Examples of methods of using the above-mentioned cement-dispersing agent are as follows: a method comprising dissolving this agent in water for kneading and then adding the resulting mixture to a cement composition during its preparation, and a method comprising adding that agent to a cement composition of which the kneading has already finished.

The new polymer of the present invention is useful as a stabilizer for hydrogen peroxide. That is, this polymer is particularly useful as a stabilizer for hydrogen peroxide in the case of bleaching fiber, pulp and the like by hydrogen peroxide. This new polymer can display bleaching effects superior to those displayed by conventional sodium silicate. Because of this, problems are solved that in the case of using sodium silicate, impediments due to this silicate are harassments. The new polymer of the present invention suppresses the deterioration of fiber strength after bleaching, has superior abilities to eliminate metals and to block metal ions, and gives good feeling to bleached articles. Like this, this polymer displays superior bleaching effects which are not obtained by the known hydrogen peroxide bleachers.

The detergent composition of the present invention comprises the detergent builder of the present invention and can be used in any condition of powder, solid and liquid. This detergent composition further comprises a surfactant. This surfactant may be any one of anionic, nonionic, ampholytic, and cationic surfactants and also may be used either as one kind alone or in combination of two or more kinds. The detergent composition of the present invention comprises, for example, 100 parts by weight of the surfactant and 0.3 to 200 parts by weight (preferably 0.5 to 100 parts by weight) of the detergent builder of the present invention. If the amount of the detergent builder of the present invention is less than the above-mentioned range, there may not practically be expected the merits obtained by its addition. In addition, if this amount is more than the above-mentioned range, there may be an economical disadvantage.

With respect to the detergent composition of the present invention, there may be used, in addition to the detergent builder of the present invention, conventional detergent builders such as condensed phosphoric acid salts, zeorite, citric acid salts, polyacrylic acid salts and acrylic acid/ maleic acid copolymer salts. In this case, the ratio for use may be set according to circumstances and there is no especial limitation.

Furthermore, according to circumstances, into the detergent composition of the present invention there may be added, besides the surfactant and the detergent builder, other components, as usually used for conventional detergent compositions, such as alkalis, inorganic electrolytes, chelating agents, re-pollution preventing agents, enzymes, bleachers, fluorescent agents, antioxidizing agents, solubilizers, coloring agents and perfumes. The amount of these additives combined may be, for example, conventional.

The pigment dispersion of the present invention comprises, for example, 100 parts by weight of a pigment, 0.02 to 5 parts by weight (preferably 0.05 to 2 parts by weight) of the pigment-dispersing agent of the present invention and 10 to 2,000 parts by weight (preferably 20 to 1,000 parts by weight) of an aqueous medium in which the pigment-dispersing agent and the pigment are dispersed.

If the amount of the pigment-dispersing agent of the present invention is either less or more than the above-mentioned range, there may not be obtained a homogeneous pigment dispersion.

The cement composition of the present invention comprises, for example, 100 parts by weight of hydraulic cement, 0.01 to 1.5 parts by weight (preferably 0.05 to 1 parts by weight) of the cement-dispersing agent of the present invention, 20 to 70 parts by weight (preferably 30 to 60 parts by weight) of water for kneading, 100 to 1,000 parts by weight (preferably 200 to 800 parts by weight) of an aggregate.

If the amount of the cement-dispersing agent is less than the above-mentioned range, there may not be obtained a cement composition having high fluidity. In addition, if this amount is more than the above-mentioned range, there may occur a problem of retarding the time for setting the cement composition.

If the amount of each of the water for kneading and the aggregate is either less or more than the above-mentioned range, there may not be obtained cement having superior strength after setting.

As examples of the aggregate, there are cited sand, gravel, crashed stones. and so on.

The bleaching composition of the present invention comprises, for example, 100 parts by weight of hydrogen peroxide and 0.01 to 10 parts by weight (preferably 0.05 to 5 parts by weight) of the stabilizer for hydrogen peroxide of the present invention. If the amount of the stabilizer for hydrogen peroxide is less than the above-mentioned range, no stabilizing effect may be displayed. In addition, if this amount is more than the above-mentioned range, there is an economical disadvantage.

As occasion demands, the bleaching composition of the present invention may further comprise other components used usually such as alkalis, surfactants and inorganic electrolytes. The amount of these additives may be, for example, conventional.

The coated molded product of the present invention comprises a coating layer and a molded base material of which the surface is coated with said coating layer comprising a gas barrier agent of the present invention.

The new polymer of the present invention is useful as a gas barrier agent. For examples, a film comprising this polymer or a composition coated with a coating liquid containing this polymer is a useful means for cutting off permeation of gases. These film and coated composition display superior performance as oxygen- and water-barriers not only under dry conditions, but also under wet conditions.

To obtain the above-mentioned film, for example, an aqueous solution of the new polymer (preferably, that of its ammonium salt) may intactly be converted into a film. In addition, to obtain the above-mentioned coated composition, an aqueous solution of the new polymer (preferably, that of its ammonium salt) may be coated onto a proper molded base material and then dried. The method for carrying out coating by the gas barrier agent of the present invention is not especially limited as long as it is a method wherein the gas barrier agent is coated onto a molded base material and then dried. As such a method, there may be used for example, the following conventional methods: roll coating, dip coating, bar coating, nozzle coating and any combination thereof. In addition, before coating, for the molded base material, there may be carried out surface-activating treatment such as corona treatment, or anchor treatment using a known anchor treating agent such as urethane resins.

After coating is carried out, the coating layer is cured and dried. This curing and drying may be carried out at normal temperature. However, in the case where fast curing and drying is desired, heating treatment may be carried out at a lower heat-resistant temperature of the molded base material. The thickness of a coating layer made of the gas barrier agent of the present invention is preferably in a range of 0.001 to 20 μm and more preferably in a range of 0.01 to 10 μm. If the thickness is less than 0.01 μm, an even coating film is not formed and pin holes occur to a coating film. If the thickness is more than 10 μm, the coating film is too thick and therefore, there is a possibility that cracking may occur to the coating film.

The material used as the molded base material to be coated is not especially limited. However, its examples are as follows: polyolefin resins such as polyethylene and polypropylene; polyester resins polyethylene telephthalate, polyethylene isophthalate, polyethylene-2,6-naphthalate, polybutylene telephthalate and any copolymer thereof; polyether resins such as polyoxymethylene; polyamide resins such as nylon-6, nylon-6,6 and polymetaxyleneadipamide; thermoplastic resins such as polystyrene, poly(meth)acrylic acid esters, polyacrylonitrile, polyvinyl acetate, polycarbonate, cellophane, polyimide, polyetherimide, polyphenylenesulfone, polyethersulfone, polysulfone, polyetherketone, ionomer resins and fluorine resins; thermosetting resins such as melamine, polyurethane, thermosetting (meth)acrylic acid esters and epoxy resins.

As the shape of the molded product, there are cited, for example, shapes such as film, sheet and bottle. If the gas barrier agent of the present invention is used, since part or most of the new polymer molecules form lactone rings at a drying step, water resistance of a film becomes higher with increase of the lactone rings and it is possible to easily obtain a film or a surface-treated product which are superior in transparency, flexibility and gas barrier ability.

The new polymer relating to the present invention comprises in its structure the particular $\alpha$-glycol structure unit and the particular carboxylic acid-based structure unit, and these units greatly improve dispersing and chelating abilities.

On the other hand, when the pH of a system is lowered, a hydroxyl group in the $\alpha$-glycol structure unit and a carboxyl group in the carboxylic acid-based structure unit adjacent to the $\alpha$-glycol structure unit react with each other to form a hydrophobic lactone ring. Therefore, as to this polymer of the present invention, it is possible to change its water-solubility to hydrophobicity and also to display water resistance. In addition, since if the lactone ring is formed in the above-mentioned way the hydrophilic carboxyl and hydroxyl groups coexists with the hydrophobic lactone ring, surface activity is given. In practice, for example, an aqueous solution of a partial ammonium salt of the polymer of the present invention is heated to evaporate ammonia out of a system to convert the polymer into an insoluble one, whereby water resistance is improved. By taking advantage of this, the polymer of the present invention can be applied to various kinds of films such as a gas barrier film; promoters for paper-making such as a sizing agent for paper, a coating composition for paper and a paper power-reinforcing agent; paste for fibers; adhesives; binders; and so on.

In the production process of the present invention, as aforementioned, to obtain the new polymer, there are carried out the following steps of: copolymerizing a monomer composition comprising the conjugated diene monomer and the carboxylic acid-based monomer; and then oxidizing a double-bond part of the double bond-containing structure unit of the resulting copolymer or its neutralized product by using an oxidizing agent to form the $\alpha$-glycol structure unit. Therefore, procedures are simple, there is not involved an industrially disadvantageous reaction such as an elimination reaction, post-treatment is simple, and the above-mentioned new polymer can be obtained at a low cost.

The lactone ring contained in the new polymer of the present invention is opened in the presence of an alkaline substance to form a carboxyl group and a hydroxyl group ($\alpha$-glycol). The carboxyl and hydroxyl groups formed by this ring-opening reaction, or a carboxyl group and a hydroxyl group ($\alpha$-glycol) as originally contained in the polymer, greatly improve superior dispersibility and chelatability and also the $\alpha$-glycol unit displays decomposability. In addition, since it is possible to allow hydrophilic carboxyl and hydroxyl groups to coexist with a hydrophobic lactone group, surface activity is displayed. In addition, since it is possible to allow the above-mentioned lactone ring-opening reaction to progress gradually, the carboxyl and hydroxyl groups can be formed continuously, gradually or durably. Therefore, the polymer of the present invention is also preferable to uses which demand the aforementioned dispersibility, chelatability, decomposability and surface activity continuously, gradually or durably, for example, to uses such as a pigment-dispersing agent, a cement-dispersing agent and a bleaching stabilizer.

Each use of the new polymer of the present invention displays superior performance because of the aforementioned superior physical properties of this polymer.

DESCRIPTION OF THE PREFERRED EMBODIMENTS

Hereinafter, this invention is illustrated by the following examples of some preferred embodiments in comparison with comparative examples not according to the invention. However, this invention is not limited to the undermentioned examples. Furthermore, in the examples and comparative examples, unless otherwise noted, the unit "part(s)" denotes "part(s) by weight".

EXAMPLE A1

Into a steel-made autoclave equipped with a stirrer, thermometer, pressure gauge and two gas-introducing tubes were placed 157.6 g of maleic anhydride, 14.4 g of azobisisobutyronitrile and 482.6 g of cyclohexanone. While stirring the inside of the autoclave, operation of increasing the inside pressure by 5 kg/cm$^2$ with a nitrogen gas and then depressing was repeated several times to sufficiently replace air in the autoclave with a nitrogen gas and the autoclave was heated to 70° C. Then, a mixed solution comprising 96.6 g of butadiene and 96.6 g of cyclohexanone was added into the autoclave in a 120-minute period. After completion of the adding, the autoclave was maintained at 70° C. for 60 minutes to complete a polymerization reaction. The resulting polymer solution was subjected to reprecipitation using a large excess of diethyl ether. The precipitate was filtrated and then dried at 60° C. under reduced pressure, whereby a butadiene-maleic acid copolymer (A1) was obtained.

Next, into a glass-made reaction vessel equipped with a stirrer, thermometer and gas-introducing tube were placed 15.8 g of the butadiene-maleic acid copolymer (A1), 17.0 g of a 48% aqueous sodium hydroxide solution and 281.5 g of water. While stirring the inside of the reaction vessel, the inside atmosphere was replaced with a nitrogen gas and the reaction vessel was cooled to 0° C. by immersing it in an ice bath. Then, while maintaining the inside temperature in the range of 1° to 2° C., 500 g of a 1N aqueous potassium permanganate solution was added to the reaction vessel in a 6-hour period. After completion of the adding, the contents of the reaction vessel were subjected to centrifugal separation. The resulting supernatant liquid was filtrated using a 45 μm-membrane filter and then subjected to dialysis using a cellophane tube for one day and one night, whereby a copolymer (A1) was obtained.

The carboxylic acid concentration and hydroxyl group concentration based on a solid content calculated as an acid type of this copolymer (A1) were 9.6 mmol/g and 9.4 mmol/g respectively. In measurement by proton nuclear magnetic resonance spectroscopy, no double bond was detected. According to measurement of molecular weight distribution using gel permeation chromatography (hereinafter abbreviated as "GPC"), the weight-average molecular weight of the copolymer was 3,700.

Next, hydrochloric acid was added to an aqueous solution of the copolymer (A1) to adjust the pH at 2.0. As a result, a polymer was deposited. This polymer was dried to obtain a copolymer (B1). For this copolymer (B1), its carboxylic acid and hydroxyl group concentrations were measured. As a result, the carboxylic acid concentration was 4.8 mmol/g and the hydroxyl group concentration was 4.6 mmol/g. In addition, an infrared absorption spectrum of this polymer showed absorption near 1771 $cm^{-1}$. This result shows that if the copolymer (A1) is placed under acidic conditions, a 5-membered ring lactone is formed.

EXAMPLE A2

Into the same glass-made reaction vessel as used in Example A1 were placed 18.7 g of the butadiene-maleic acid copolymer (A1) obtained in Example A1, 24.5 g of formic acid and 31.3 g of water. While stirring the inside of the reaction vessel, the inside atmosphere was replaced with a nitrogen gas. Then, 15.3 g of a 30% aqueous hydrogen peroxide solution was added to the reaction vessel at room temperature in a 10-minute period. After completion of the adding, stirring was continued and the reaction vessel was cooled so that the inside temperature might not rise to 70° C. or higher and, under this condition, stirring was carried out for 6 hours.

The contents of the reaction vessel were filtered, pulverized, and then dried at 60° C. under reduced pressure to obtain a copolymer (B2). For this copolymer (B2), the carboxylic acid concentration was 2.2 mmol/g and the hydroxyl group concentration was 2.2 mmol/g. In measurement by proton nuclear magnetic resonance spectroscopy, almost no double bond was detected. An infrared absorption spectrum of this polymer showed absorption near 1771 $cm^{-1}$ due to a 5-membered ring lactone. To 6.5 g of the copolymer (B2) were added 10.7 g of a 48% aqueous sodium hydroxide solution and 76.2 g of water. The temperature of the resulting mixture was maintained at 97° C. for 260 minutes with stirring, whereby a copolymer (A2) was obtained. The carboxylic acid concentration based on a solid content calculated as an acid type of this copolymer (A2) was 9.6 mmol/g. This copolymer (A2) showed a weight-average molecular weight of 28,000 in measurement of molecular weight distribution using the GPC.

EXAMPLE A3

The procedure of Example A1 was repeated except that the amount of azobisisobutyronitrile used was changed to 1.9 g, whereby a butadiene-maleic acid copolymer (A3) was obtained. Next, into the same glass-made reaction vessel as used in Example A1 were placed 18.7 g of the butadiene-maleic acid copolymer (A3), 24.5 g of formic acid and 31.3 g of water. While stirring the inside of the reaction vessel, the inside atmosphere was replaced with a nitrogen gas.

Then, 15.3 g of a 30% aqueous hydrogen peroxide solution was added to the reaction vessel at room temperature in a 10-minute period. After completion of the adding, stirring was continued and the reaction vessel was cooled so that the inside temperature might not rise to 70° C. or higher and, under this condition, stirring was carried out for 6 hours. The contents of the reaction vessel were filtered, pulverized, and dried at 60° C. under reduced pressure to obtain a copolymer (B3). For this copolymer (B3), the carboxylic acid concentration was 3.3 mmol/g and the hydroxyl group concentration was 3.2 mmol/g. In measurement by proton nuclear magnetic resonance spectroscopy, almost no double bond was detected. An infrared absorption spectrum of this polymer showed absorption near 1771 $cm^{-1}$ due to a 5-membered ring lactone. To 6.5 g of the copolymer (B3) were added 10.7 g of a 48% aqueous sodium hydroxide solution and 76.2 g of water. The temperature of the resulting mixture was maintained at 97° C. for 260 minutes with stirring, whereby a copolymer (A3) was obtained. The carboxylic acid concentration based on a solid content calculated as an acid type of this copolymer (A3) was 9.6 mmol/g. This copolymer (A3) showed a weight-average molecular weight of 140,000 in measurement of molecular weight distribution using the GPC.

EXAMPLE A4

Into the same autoclave as used in Example A1 were placed 107.8 g of maleic anhydride, 13.2 g of azobisisobutyronitrile and 348.0 g of dioxane. While stirring the inside of the autoclave, operation of increasing the inside pressure by 5 kg/$cm^2$ with a nitrogen gas and then depressing was repeated several times to sufficiently replace air in the autoclave with a nitrogen gas and the autoclave was heated to 80° C. Then, a mixed solution comprising 59.5 g of butadiene and 59.5 g of dioxane and another mixed solution comprising 158.4 g of acrylic acid and 67.9 g of dioxane were added into the autoclave in an 80-minute period. After completion of the adding, the autoclave was maintained at 80° C. for 60 minutes to complete a polymerization reaction. The resulting polymer solution was subjected to reprecipitation using a large excess of diethyl ether. The precipitate was filtrated and then dried at 60° C. under reduced pressure, whereby a butadiene-maleic acid copolymer (A4) was obtained.

Into the same glass-made reaction vessel as used in Example A1 were placed 18.7 g of the butadiene-maleic acid copolymer (A4), 12.3 g of formic acid and 31.3 g of water. While stirring the inside of the reaction vessel, the inside atmosphere was replaced with a nitrogen gas. Then, 7.7 g of a 30% aqueous hydrogen peroxide solution was added to the reaction vessel at room temperature in a 10-minute period. After completion of the adding, stirring was continued and the reaction vessel was cooled so that the inside temperature might not rise to 70° C. or higher and, under this condition, stirring was carried out for 6 hours. The contents of the reaction vessel were filtrated, pulverized, and dried at 60° C. under reduced pressure to obtain a copolymer (B4). For this copolymer (B4), the carboxylic acid concentration was 5.3 mmol/g and the hydroxyl group concentration was 0.9 mmol/g. In measurement by proton nuclear magnetic resonance spectroscopy, almost no double bond was detected. An infrared absorption spectrum of this polymer showed absorption near 1771 $cm^{-1}$ due to a 5-membered ring lactone.

Next, to 6.5 g of this copolymer (B4) were added 16.1 g of a 48% aqueous sodium hydroxide solution and 76.2 g of water. The temperature of the resulting mixture was maintained at 97° C. for 260 minutes with stirring, whereby a copolymer (A4) was obtained. The carboxylic acid concentration based on a solid content calculated as an acid type of this copolymer (A4) was 10.9 mmol/g. This copolymer (A4) showed a weight-average molecular weight of 21,000 in measurement of molecular weight distribution using the GPC.

The copolymers (A1) to (A4) obtained in Examples A1 to A4 comprised the below-mentioned structure units I to III in the following ratios (mol %):

|  | I | II | III |
|---|---|---|---|
| Copolymer (A1) | 47.7 | 48.7 | 3.6 |
| Copolymer (A2) | 48.8 | 47.9 | 3.3 |
| Copolymer (A3) | 49.0 | 49.6 | 1.4 |
| Copolymer (A4) | 56.5 | 41.1 | 2.4 | where the structure unit I was

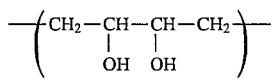

the structure unit II was

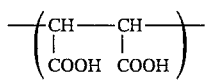

and the structure unit III was

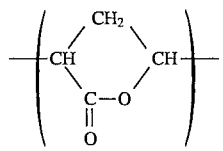

The above-mentioned structure units and their ratios were confirmed by:
1) the carboxylic acid concentration determined by the neutralization titration (unit I),
2) the hydroxyl group concentration determined by the acetylation method using acetic anhydride and pyridine (unit II),
3) the absorption of a 5-membered ring lactone at 1780 to 1750 cm$^{-1}$ in the infrared absorption spectra (unit III), and
4) a fact that the infrared absorption spectra showed no absorption of double bonds, which shows almost all double bonds were oxidized to form the α-glycol structure.

Particularly, the copolymer (A2) showed in its infrared absorption spectrum the following absorption: a carboxylic acid salt at 1610 to 1550 cm$^{-1}$, hydroxyl groups at 3650 to 3200 cm$^{-1}$ and a 5-membered ring lactone near 1760 cm$^{-1}$; and no absorption of double bonds. The other copolymers (A1), (A3) and (A4) also showed the infrared absorption spectra similar to that of the copolymer (A2).

EXAMPLES A5 TO A8

The copolymers (A1) to (A4) obtained in Examples A1 to A4 were used as detergent builders to obtain detergent compositions of the following formulation.

| Sodium alkylbenzenesulfonate: | 25 parts |
|---|---|
| Builder: | 20 parts |
| Sodium silicate: | 5 parts |
| Anhydrous sodium carbonate: | 3 parts |
| Carboxymethyl cellulose: | 0.5 parts |
| Anhydrous sodium sulfate: | 40 parts |
| Water: | balance |
| Total of the detergent composition: | 100 parts |

COMPARATIVE EXAMPLE A1

The procedure of Examples A5 to A8 was repeated except that a sodium salt of the butadiene-maleic acid copolymer (A1) obtained in Example A1 was used as a builder instead of the copolymers (A1) to (A4), whereby a detergent composition was obtained.

COMPARATIVE EXAMPLE A2

The procedure of Examples A5 to A8 was repeated except that a sodium polyacrylate (weight-average molecular weight: 4,000) was used as a builder instead of the copolymers (A1) to (A4), whereby a detergent composition was obtained.

The washing power of each detergent composition of Examples A5 to A8 and Comparative Examples A1 and A2 was examined by the following method. The results were shown in Table A1.

The detergent composition was dissolved into tap water of 3° DH hardness so that the concentration might be 0.2% by weight, whereby a washing liquid was prepared. An artificially contaminated cotton cloth was immersed into this washing liquid (temperature: 25° C.) (bath ratio: 30 times) to wash the cloth using a washing apparatus (Terg-O-Tometer made by Ueshima Seisakusho Co., Ltd.) at 100 rpm for 10 minutes. Thereafter, the cloth was rinsed with 3° DH tap water (temperature: 25° C.) using the same apparatus for 5 minutes and then dried naturally. For the thus-washed cloth, the dirt-removal degree was judged by the eye on the following standards using the sodium polyacrylate of Comparative Example A2 as a standard builder.

TABLE A1

|  | Builder | Washing power |
|---|---|---|
| Example A5 | Copolymer (A1) | ⊚ |
| Example A6 | Copolymer (A2) | ⊚ |
| Example A7 | Copolymer (A3) | ⊚ |
| Example A8 | Copolymer (A4) | ⊚ |
| Comparative Example A1 | Sodium salt of butadiene-maleic acid copolymer (A1) | ○ |
| Comparative Example A2 | Sodium polyacrylate | ○ |

⊚: Superior.
○: Almost the same.
Δ: Slightly inferior.
x: Pretty inferior.

As seen in Table A1, it was confirmed that, regardless of conditions of the detergent compositions, the detergent builders comprising each of the copolymers (A1) to (A4) obtained in Examples A1 to A4 can enhance the washing power of the detergent compositions more greatly and are more useful, as compared with the detergent builders of Comparative Examples A1 and A2.

EXAMPLES A9 TO A12

By a method shown below, the aforementioned copolymers (A1) to (A4) were used as pigment-dispersing agents to prepare coatings for paper, and the viscosity stability of the coatings were measured. First, a slurry of heavy calcium carbonate was prepared from a dispersing agent and water. With this slurry was combined clay, and then 20%-modified starch and a 50% SBR latex were further added in sequence. The resulting mixture was kneaded to prepare a water base coating of 60% solid content, wherein the weight ratio calculated as solid content of each component was clay/ heavy calcium carbonate/dispersing agent/starch/SBR latex=60/40/0.2/10/10. The viscosity of the thus-obtained coating was measured just after and 1 day after its preparation. The results were shown in Table A2.

COMPARATIVE EXAMPLE A3

The procedure of Examples A9 to A12 was repeated to prepare a coating and measure its viscosity stability, except that a sodium salt of the butadiene-maleic acid copolymer (A1) obtained in Example A1 was used as a pigment-dispersing agent instead of the copolymers (A1) to (A4). The results were shown in Table A2.

COMPARATIVE EXAMPLE A4

The procedure of Examples A9 to A12 was repeated to prepare a coating and measure its viscosity stability, except that a sodium polyacrylate (weight-average molecular weight: 4,000) was used as a pigment-dispersing agent instead of the copolymers to (A1) to (A4). The results were shown in Table A2.

TABLE A2

| | Pigment-dispersing agent | Viscosity of coating (cps, 25° C.) | |
|---|---|---|---|
| | | Just after preparation | 1 day after preparation |
| Example A9 | Copolymer (A1) | 700 | 760 |
| Example A10 | Copolymer (A2) | 750 | 800 |
| Example A11 | Copolymer (A3) | 840 | 880 |
| Example A12 | Copolymer (A4) | 780 | 800 |
| Comparative Example A3 | Sodium salt of butadiene-maleic acid copolymer (A1) | 980 | 1400 |
| Comparative Example A4 | Sodium polyacrylate | 1050 | 1500 |

As seen in Table A2, it was confirmed that the pigment-dispersing agents comprising each of the copolymers (A1) to (A4) obtained in Examples A1 to A4 have a greater effect to lower the viscosity of high solid coatings and also have a superior effect to stabilize the viscosity of coatings, as compared with the dispersing agents of Comparative Examples A3 to A4.

EXAMPLE A13

There were used the following materials: ordinary portland cement (made by Sumitomo Cement Co., Ltd.) as cement, river sand taken from the Yodo River in Japan as a fine aggregate (specific gravity: 2.51, fineness modulas (F.M.): 2.78), crushed stones taken from Takatsuki-shi in Japan as a coarse aggregate (specific gravity: 2.68, F.M.: 6.73) and the copolymer (A1) obtained in Example A1 as a cement-dispersing agent. These materials were respectively weighed so as to make 30 liters in the amount of a kneaded mixture with the composition comprising a unit ratio of 320 kg/m$^3$ for cement, a unit ratio of 173 kg/m$^3$ for water (ratio of water to cement: 54.2%), a unit ratio of 934 kg/m$^3$ for fine aggregate, a unit ratio of 876 kg/m$^3$ for coarse aggregate (fine aggregate percentage: 52%), and an addition amount of 0.30% by weight (ratio of a solid content to cement) for the copolymer (A1). All the materials were placed into a tilting mixer and then, immediately, kneading was carried out for 3 minutes at 35 rpm, whereby fluid concrete having an objective slump of 18 cm and an objective air amount of 4.5% was prepared (however, in the case where the objective air amount was not attained, a slight amount of an air-entraining agent ("Vinsol" made by Yamaso Chemical Co., Ltd.) was used). Immediately after completion of the kneading, the fluid concrete was sampled to measure its slump and air amount.

After completion of the kneading, the rotating number of the tilting mixer was reduced to 3 rpm and the kneading was further continued and then, after 60 minutes, the slump and air amount were measured to investigate their changes with time-passage. In addition, the compressive strength and setting time of the fluid concrete obtained were measured. Results of the measurement were shown in Table A3.

The measurement methods for the slump, air amount, compressive strength and setting time, and the method to take a sample for testing the compressive strength and setting time were based on the Japanese Industrial Standard (JIS) A6204.

EXAMPLES A14 TO A16 AND B1 TO B4

The procedure of Example A13 was repeated except that the copolymers (A2) to (A4) obtained in Examples A2 to A4 and the copolymers (B1) to (B4) obtained in Examples A1 to A4 were used as cement-dispersing agents in the addition amounts shown in Table A3 instead of the copolymer (A1) obtained in Example A1, whereby fluid concrete was prepared. The slump, air amount, compressive strength and setting time of this fluid concrete were measured in the same way as of Example A13. The results were shown in Table A3.

COMPARATIVE EXAMPLE A5

The procedure of Example A13 was repeated except that a commercially available sodium naphthalenesulfonate-formalin condensation product was used as a cement-dispersing agent in an addition amount of 0.35% by weight (based on cement) instead of the copolymer (A1), whereby comparative fluid concrete was prepared. The slump, air amount, compressive strength and setting time of this comparative fluid concrete were measured in the same way as of Example A13. The results were shown in Table A3.

COMPARATIVE EXAMPLE A6

The procedure of Example A13 was repeated except that a commercially available sodium ligninsulfonate was used as a cement-dispersing agent in an addition amount of 0.35% by weight (based on cement) instead of the copolymer (A1), whereby comparative fluid concrete was prepared. The slump, air amount, compressive strength and setting time of this comparative fluid concrete were measured in the same way as of Example A13. The results were shown in Table A3.

TABLE A3

| | Cement-dispersing agent | | Immediately after completion of kneading | | After 60 minutes | | Compressive strength at age of 28 days of materials (kg/cm$^2$) | Setting time (hour:minute) beginning/ finishing |
|---|---|---|---|---|---|---|---|---|
| | Kind | Addition amount (Solid content %) (based on cement) | Slump (cm) | Air amount (%) | Slump (cm) | Air amount (%) | | |
| Example A13 | Copolymer (A1) | 0.30 | 18.5 | 3.8 | 17.4 | 3.6 | 330 | 6:10/7:35 |
| Example A14 | Copolymer (A2) | 0.32 | 17.8 | 3.7 | 17.2 | 3.9 | 325 | 5:30/7:25 |
| Example A15 | Copolymer (A3) | 0.35 | 16.3 | 3.5 | 17.3 | 3.4 | 310 | 5:25/7:20 |
| Example A16 | Copolymer (A4) | 0.30 | 18.3 | 4.3 | 18.0 | 4.5 | 315 | 5:10/7:10 |
| Example B1 | Copolymer (B1) | 0.32 | 18.0 | 3.7 | 17.8 | 3.9 | 315 | 6:20/7:50 |
| Example B2 | Copolymer (B2) | 0.33 | 17.4 | 3.9 | 17.3 | 4.2 | 330 | 5:45/7:10 |
| Example B3 | copolymer (B3) | 0.36 | 16.8 | 3.8 | 17.8 | 4.7 | 350 | 5.20/7:10 |
| Example B4 | Copolymer (B4) | 0.32 | 18.0 | 4.4 | 17.8 | 4.8 | 335 | 5:30/7:30 |
| Comparative Example A5 | NSF *1 | 0.35 | 18.6 | 4.3 | 8.3 | 4.0 | 321 | 5:13/7:01 |
| Comparative Example A6 | LS *2 | 0.35 | 18.8 | 5.2 | 9.8 | 5.6 | 334 | 5:24/7:18 |

*1: Sodium naphthalenesulfonate-formalin condensation product
*2: Sodium ligninsulfonate As seen in Table A3, it was confirmed that the fluid concrete of Examples A13 to A16 and B1 to B4 display a superior ability to prevent slump loss with almost no retard of the setting time, as compared with the comparative fluid concrete of Comparative Examples A5 to A6.

EXAMPLE A17

There was prepared an aqueous solution with the composition comprising 30 g/l of 35% $H_2O_2$, 7 g/l of NaOH, 0.1 g/l of $MgSO_4 \cdot 7H_2O$, 0.021 g/l of $FeCl_2 \cdot 4H_2O$, and 5 g/l (as a solid content) of the copolymer (A1) obtained in Example A1. This aqueous solution was heated at 60° C. for 30 minutes. Then, the residual amount of $H_2O_2$ was measured by a $KMnO_4$-titration method and compared with the initial amount of $H_2O_2$ before heating, whereby the residual ratio of $H_2O_2$ was determined. The result was shown in Table A4.

EXAMPLES A18 TO A20

The procedure of Example A17 was repeated except that the copolymers (A2) to (A4) obtained in Examples A2 to A4 were used instead of the copolymer (A1), whereby the residual ratio of $H_2O_2$ was determined. The results were shown in Table A4.

COMPARATIVE EXAMPLE A7

The procedure of Example A17 was repeated except that a sodium polyacrylate (weight-average molecular weight: 4,000) was used instead of the copolymer (A1), whereby the residual ratio of $H_2O_2$ was determined. The result was shown in Table A4.

COMPARATIVE EXAMPLE A8

The procedure of Example A17 was repeated except that the copolymer (A1) was not used at all, whereby the residual ratio of $H_2O_2$ was determined. The result was shown in Table A4.

TABLE A4

| | Stabilizer | Residual amount of $H_2O_2$ (%) |
|---|---|---|
| Example A17 | Copolymer (A1) | 36 |
| Example A18 | Copolymer (A2) | 40 |
| Example A19 | Copolymer (A3) | 41 |
| Example A20 | Copolymer (A4) | 38 |
| Comparative Example A7 | Sodium polyacrylate | 10 |
| Comparative Example A8 | — | 8 |

As seen in Table A4, it was confirmed that the copolymers (A1) to (A4) obtained in Examples A1 to A4 have a superior effect to stabilize $H_2O_2$.

EXAMPLES A21 TO A24

There were mixed 25 g of an urethane coating (Takenate A-3 made by Takeda Chemical Industries, Ltd.), 150 g of an urethane coating (Takeluck A-310 made by Takeda Chemical Industries, Ltd.) and 500 g of ethyl acetate to obtain an urethane undercoating. This undercoating was coated on a 25 μm PET film by a dipping method and then drying was carried out at 120° C. for 30 minutes to obtain a film as a basic molding matter.

The copolymers (A1) to (A4) obtained in Examples A1 to A4 were converted into ammonium salts thereof to obtain aqueous solutions having a solid content of 5% by weight. Each of these solutions was coated on the above-obtained basic molding matter by a dipping method and then drying was carried out at 120° C. for 30 minutes to obtain molding matters coated with a transparent film. For the coated molding matters obtained, the following characteristic tests ① to ③ were carried out. The results were shown in Table 5.

① Oxygen-permeability:

It was measured by an apparatus for measuring gas-permeability, made by Toyo Seiki Seisakusho Co., Ltd., according to JIS K-7126.

② Flexibility:

When the matter was folded by 180°, the case where the coating film did not crack was symbolized as "o", and the case where the coating film cracked was symbolized as "X".

③ Transparency:

When the matter was compared with the original PET film before coating, the case where no difference in transparency was seen was symbolized as "o", and the case where white turbidity was seen was symbolized as "X".

COMPARATIVE EXAMPLE A9

The above-mentioned tests ① to ③ were carried out for the PET film, used in Examples A21 to A24, under its original conditions where nothing was coated on the film. The results were shown in Table A5.

TABLE A5

|  | Coating material | Film thickness (μm) | Oxygen-permeability (cc/m² · 24 hrs · atm) | Flexibility | Transparency |
|---|---|---|---|---|---|
| Example A21 | Copolymer (A1) | 2 | 7.0 | O | O |
| Example A22 | Copolymer (A2) | 2 | 6.8 | O | O |
| Example A23 | Copolymer (A3) | 3 | 6.5 | O | O |
| Example A24 | Copolymer (A4) | 2 | 7.8 | O | O |
| Comparative Example A9 | — | — | 70.01 | O | O |

As seen in Table A5, it was confirmed that the copolymers (A1) to (A4) obtained Examples A1 to A4 are useful as gas barrier agents.

EXAMPLES A25 TO A28

Using the copolymers (A1) to (A4) as pigment-dispersing agents, slurries comprising calcium carbonate and water were prepared to measure viscosity of the slurries by the following method.

Into a slurry of 60/40 in ratio by weight of light calcium carbonate to water was added each of the above-mentioned dispersing agents in an amount of 0.15% by weight or 0.2% by weight based on calcium carbonate. Stirring was carried out for 3 minutes to obtain slurries. The viscosity of the resulting slurries was measured by a B-type rotating viscometer. However, when no dispersing agent was added, the slurries showed almost no fluidity and thus it was impossible to measure the viscosity. The results were shown in Table A6.

COMPARATIVE EXAMPLE A10

The procedure of Example A25 to A28 was repeated to prepare calcium carbonate slurries and measure their viscosity, except that a sodium salt of the butadiene-maleic acid copolymer (A1) obtained in Example A1 was used as a pigment-dispersing agent instead of the copolymers (A1) to (A4). The results were shown in Table A6.

COMPARATIVE EXAMPLE A11

The procedure of Example A25 to A28 was repeated to prepare calcium carbonate slurries and measure their viscosity, except that a sodium polyacrylate (weight-average molecular weight: 4,500) was used as a pigment-dispersing agent instead of the copolymers (A1) to (A4). The results were shown in Table A6.

TABLE A6

|  | Pigment-dispersing agent | Viscosity of calcium carbonate slurry (cps) | |
|---|---|---|---|
|  |  | Addition amount 0.15% by weight | Addition amount 0.2% by weight |
| Example A25 | Copolymer (A1) | 120 | 110 |
| Example A26 | Copolymer (A2) | 90 | 95 |
| Example A27 | Copolymer (A3) | 300 | 200 |
| Example A28 | Copolymer (A4) | 120 | 100 |
| Comparative Example A10 | Sodium salt of butadiene-maleic acid copolymer (A1) | 500 | 300 |
| Comparative Example A11 | Sodium polyacrylate | 3000 | 1500 |

As seen in Table A6, it was confirmed that the pigment-dispersing agents comprising each of the copolymers (A1) to (A4) obtained in Examples A1 to A4 have a greater effect to lower the viscosity of calcium carbonate slurries, as compared with the dispersing agents of Comparative Examples A10 to A11.

What is claimed is:

1. A polymer having hydroxyl and carboxyl groups, which comprises an α-glycol structure unit, shown by the general formula 1

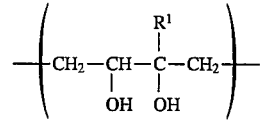

wherein $R^1$ denotes a hydrogen atom, a methyl group or a chlorine atom,
and a carboxylic acid-based structure unit shown by the general formula 2

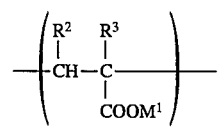

wherein $R^2$ denotes $-COOM^2$, hydrogen atom or a methyl group, wherein $R^3$ denotes hydrogen atom or a methyl group, and wherein $M^1$ and $M^2$ denote a hydrogen atom, a monovalent metal, a divalent metal, a trivalent metal, an ammonium group or an organic amine group.

2. A polymer as claimed in claim 1, which further comprises a lactone structure unit shown by the general formula 3

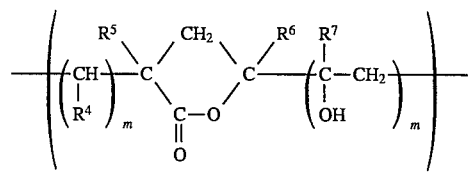

wherein $R^4$ denotes $-COOM^3$, a hydrogen atom or a methyl group, where in $R^5$ denotes a hydrogen atom or a methyl group, wherein $R^6$ and $R^7$ denote a hydrogen atom, a methyl group or a chlorine atom, with the proviso that at least one of $R^6$ and $R^7$ is a hydrogen atom, wherein $M^3$ denotes a hydrogen atom, a monovalent metal, a divalent metal, a trivalent metal, an ammonium group or an organic amine group, and wherein m is 0 or 1.

3. A polymer as claimed in claim 1, which has a weight-average molecular weight within the range of 1,000 to 1,000,000.

4. A polymer as claimed in claim 2, which has a weight-average molecular weight within the range of 1,000 to 1,000,000.

5. A polymer as claimed in claim 1, wherein said carboxylic acid-based structure unit is at least one member selected from the group consisting of a (meth)acrylic acid structure unit, a maleic acid structure unit and a fumaric acid structure unit.

6. A polymer as claimed in claim 2, wherein said carboxylic acid-based structure unit is at least one member selected from the group consisting of a (meth)acrylic acid structure unit, a maleic acid structure unit and a fumaric acid structure unit.

7. A polymer as claimed in claim 1, which comprises, based on the total of all structure units, 20 to 75 mol % of said α-glycol structure unit and 20 to 75 mol % of said carboxylic acid-based structure unit.

8. A process for producing a polymer having hydroxyl and carboxyl groups, which comprises the steps of:

(1) copolymerizing a monomer composition comprising a conjugated diene monomer, shown by the general formula 4

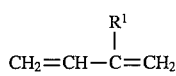

wherein $R^1$ denotes a hydrogen atom, a methyl group or a chlorine atom, and a carboxylic acid-based monomer, shown by the general formula 5

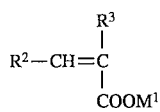

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group, to obtain a copolymer including a double bond-containing structure unit, shown by the general formula 6

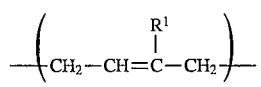

wherein $R^1$ denotes a hydrogen atom, a methyl group or a chlorine atom, and a carboxylic acid-based structure unit shown by the general formula 2

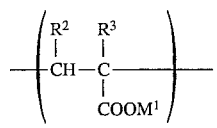

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group; and (2) oxidizing a double bond part of said double bond-containing structure unit of said copolymer using an oxidizing agent to convert said double bond-containing structure unit into an α-glycol structure unit shown by the general formula 1

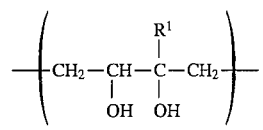

wherein $R^1$ denotes a hydrogen atom, a methyl group or a chlorine atom.

9. It method as claimed in claim 8, wherein said oxidizing agent is at least one member selected from the group consisting of permanganates, organic peroxides and combination of organic acids with hydrogen peroxide.

10. It method as claimed in claim 8, which further comprises a step of closing a lactone ring between said α-glycol structure unit and said carboxylic acid-based structure unit simultaneously with or after said oxidizing step.

11. It detergent builder comprising a polymer having hydroxyl and carboxyl groups, said polymer comprising an α-glycol structure unit, shown by the general formula 1

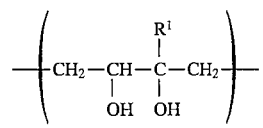

wherein $R^1$ denotes a hydrogen atom, a methyl group or a chlorine atom, and a carboxylic acid-based structure unit shown by the general formula 2

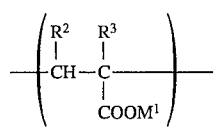

wherein $R^2$ denotes —$COOM^2$, a hydrogen atom or a methyl group, wherein $R^3$ denotes hydrogen atom or a methyl group, and wherein $M^1$ and $M^2$ denote a hydrogen atom, a monovalent metal, a divalent metal, a trivalent metal, an ammonium group or an organic amine group.

12. A pigment-dispersing agent comprising a polymer having hydroxyl and carboxyl groups, said polymer comprising an α-glycol structure unit, shown by the general formula 1

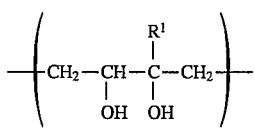

wherein $R^1$ denotes a hydrogen atom, a methyl group or a chlorine atom,
and a carboxylic acid-based structure unit shown by the general formula 2

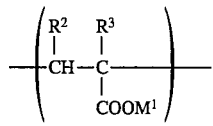

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group.

13. A cement-dispersing agent comprising a polymer having hydroxyl and carboxyl groups, said polymer comprising an α-glycol structure unit, shown by the general formula 1

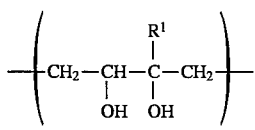

wherein $R^1$ denotes a hydrogen atom, a methyl group or a chlorine atom,
and a carboxylic acid-based structure unit shown by the general formula 2

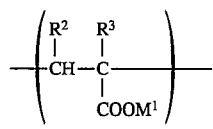

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group.

14. A stabilizer for hydrogen peroxide, comprising a polymer having hydroxyl and carboxyl groups, said polymer comprising an α-glycol structure unit, shown by the general formula 1

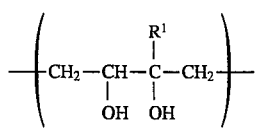

wherein $R^1$ denotes a hydrogen atom, a methyl group or a chlorine atom, and a carboxylic acid-based structure unit shown by the general formula 2

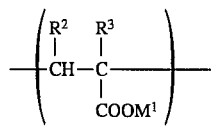

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group.

15. A gas barrier agent comprising a polymer having hydroxyl and carboxyl groups, said polymer comprising an α-glycol structure unit, shown by the general formula 1

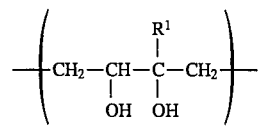

wherein $R^1$ denotes a hydrogen atom, a methyl group or a chlorine atom,
and a carboxylic acid-based structure unit shown by the general formula 2

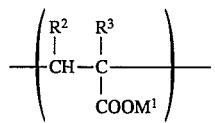

wherein $R^2$ denotes —$COOM^2$, a hydrogen atom or a methyl group, wherein $R^3$ denotes a hydrogen atom or a methyl group, and wherein $M^1$ and $M^2$ denote a hydrogen atom, a monovalent metal, a divalent metal, a trivalent metal, an ammonium group or an organic amine group.

16. The copolymer of claim 1, wherein said copolymer comprises about 22.5 to 75 mol % of said α-glycol structure unit and about 22.5 to 75 mol % of said carboxylic acid-based structure unit based on the total of the structure units of said copolymer.

17. The copolymer of claim 2, wherein said copolymer further comprises about 20 to 75 mol % of said α-glycol unit, about 20 to 75 mol % of said carboxylic acid based unit and up to about 20 mol % of said lactone of Formula 3.

18. The process of claim 8, wherein said oxidizing step is carried out at a sufficiently high pH to inhibit the formation of a lactone.

19. The process of claim 8, wherein said process further comprises the step of neutralizing said copolymer to inhibit lactone ring formation.

20. The process of claim 8, wherein said oxidizing step comprises oxidizing said copolymer with an organic peroxide.

* * * * *